United States Patent [19]

Nikaido et al.

[11] Patent Number: 5,105,238
[45] Date of Patent: Apr. 14, 1992

[54] CONTACT TYPE IMAGE SENSOR HAVING AN ORGANIC TYPE THIN FILM LIGHT EMITTING ELEMENT

[75] Inventors: Masaru Nikaido, Miura; Hiroki Nakamura, Chigasaki, both of Japan

[73] Assignee: Kabushiki Kaisha Toshiba, Kanagawa, Japan

[21] Appl. No.: 589,940

[22] Filed: Sep. 28, 1990

[30] Foreign Application Priority Data

Sep. 29, 1989 [JP]   Japan ................... 1-255889

[51] Int. Cl.$^5$ ..................... H01C 31/12; H01C 31/16
[52] U.S. Cl. ......................................... 357/19; 357/30
[58] Field of Search ................ 358/209; 357/17, 19, 357/30 K; 250/370.11, 332

[56] References Cited

U.S. PATENT DOCUMENTS

| | | | |
|---|---|---|---|
| 3,974,753 | 8/1976 | Blomgren et al. | 220/335 |
| 4,477,721 | 10/1984 | Chappell et al. | 357/19 |
| 4,626,878 | 12/1986 | Khwano et al. | 357/19 |
| 4,666,793 | 5/1987 | Hirate | 357/17 |
| 4,695,859 | 9/1987 | Guha et al. | 357/17 |
| 4,766,471 | 8/1988 | Ovshinsky et al. | 357/19 |
| 4,885,211 | 12/1989 | Tang et al. | 313/504 |
| 4,888,625 | 12/1989 | Mueller | 357/19 |
| 4,999,688 | 3/1991 | Hara et al. | 357/17 |

FOREIGN PATENT DOCUMENTS 62-279776  12/1987  Japan .

*Primary Examiner*—David K. Moore
*Assistant Examiner*—Wendy R. Greening
*Attorney, Agent, or Firm*—Finnegan, Henderson, Farabow, Garrett, and Dunner

[57] ABSTRACT

A contact type image sensor is disclosed, wherein an illumination source having a thin film light emitting element is opposed to a sensor section having thin film photo sensitive elements, a transparent substrate being disposed therebetween. The thin film light emitting element is so-called an organic thin film EL element, which comprises an anode, a hole transport thin film, an electron transport organic fluorescent thin film, and a cathode. Since the organic thin film EL element can be driven at a low DC voltage, it decrease the fluctuation of the intensity of the illumination light, resulting in remarkably imprving the reading accuracy of an image. In addition, the thin film light emitting element can be operated with a small amount of power. Moreover, it can be thinly structured.

15 Claims, 3 Drawing Sheets

FIG. I
PRIOR ART

CONTACT TYPE IMAGE SENSOR HAVING AN ORGANIC TYPE THIN FILM LIGHT EMITTING ELEMENT

BACKGROUND OF THE INVENTION

1. Field of the Invention

The present invention relates to a contact type image sensor for image input device of a facsimile machine or the like.

2. Description of the Related Art

A contact type image sensor is a photoelectric conversion sensor for reading an image erectly in the equal magnification by using a sensor section whose size is the same as the document, the sensor being placed close to the document. The features of the contact type image sensor are small in size, free adjustment in the optical system, free maintenance, easy machine designing, and so forth. As various office automation machines with an image input apparatus, such as facsimiles, OCRs, and copy machines, have spread, the contact type image sensor has been widely used.

FIG. 1 shows an example of the structure of a conventional contact type image sensor (see a paper titled "Current Situation of Amorphous Silicon Devices (translated title)" in a symposium of Society of Electrophotography of Japan (issued on May 24, 1985).

The contact type image sensor shown in FIG. 1 comprises a sensor section A and an illumination source B. The sensor section A comprises a transparent glass substrate 1, a common electrode 2, an amorphous silicon layer (hereinafter named the a-Si layer) 3 as a photosensitive material layer, a transparent electrode 4 as a separate electrode, and a protection layer 5, which are layered on the glass substrate 1 one after the other. On the sensor section A made of such parts, 2000 to 3000 photosensitive elements are disposed in an island shape and in pitches of 0.1 to 0.2 mm. Each photosensitive element disposed in the island shape has a light conductive window 6. The illumination source B comprises an LED chip 7 and an LED substrate 8. The light originated from the LED is irradiated to a document S through the glass substrate 1 and the light conductive window 6. The reflected light is entered into the a-Si layer 3 through the transparent electrode 4 as a signal light.

It is preferable to dispose one LED chip 7 in accordance with one light conductive window 6. However, when 2000 to 3000 LED chips 7 are disposed in pitches of 0.1 to 0.2 mm, the image sensor becomes very expensive. Thus, conventionally, the LED chips 7 whose size is 0.3 mm×0.3 mm are disposed in pitches of approx. 2.5 mm. However, in this case, to prevent the light from being nonuniformly irradiated to the document, it is necessary to dispose the illumination source B apart from the document S and the sensor section A. Thus, thus far, it was difficult to produce the contact type image sensor in a thin shape and at a low cost.

To solve such problems, a contact type image sensor which uses high frequency driving Electro Luminescence (hereinafter named EL) EL elements as the illumination source B has been known (disclosed in Japanese Patent Laid-Open Publication No. SHO 62-279776).

The aforementioned contact type image sensor is provided with as a sensor section a thin film photo sensitive element, which comprising a common electrode, an a-Si layer, a transparent electrode, a transparent protection layer, and so forth, the thin film photo sensitive element being disposed on one surface of a transparent substrate such as a glass substrate. On the other surface of the transparent substrate, an EL element is disposed as an illumination source, opposed to the sensor section, the EL element comprising a transparent electrode, a light emission layer composed of ZnS:Mn, CaS:Eu, SrS:Ce and so forth, an insulation layer, and a rear surface electrode, which are layered one after the other. The EL element is in a belt shape, where the width is approx. 2 mm and the length is approx. 250 mm, for example. The EL element is disposed so that it covers the entire a-Si layer.

The aforementioned EL element can be equally formed by means of thin film technologies or thick film technologies. Thus, the distribution of the light emission intensity can be kept uniform on the entire surface of the EL element. In addition, since the sensor section and the illumination source can be formed on the same glass substrate, the EL element can be structured in a thin shape.

However, to cause the aforementioned EL element to emit light, a high frequency power is required. Generally, in the image sensor, the intensity of the illumination light should be always constant. Alternatively, in this sensor, the lighting frequency of the electro luminescence light should be remarkably faster than the reading speed of an image. For example, in the G III type facsimile, the driving frequency should be 20 kHz or more, preferably, 40 kHz against the reading speed of 10 ms per line. On the other hand, in a thick film type powder EL element, when the frequency exceeds 5 kHz, the lighting frequency cannot follow the frequency of the power. In addition, this type EL element remarkably heats up and the material is occasionally melted at a particular frequency. On the other hand, although the thin film type EL element can satisfy the aforementioned conditions with respect to the light frequency, it requires a high voltage of approx. 200 V to accomplish the particular luminance as the light source of the image sensor. Thus, this type EL element spends much power and requires a large and complicated power circuit for preventing the reading operation from being affected by a power noise. In addition, since this EL element is driven at a high voltage, the emission ray fluctuates and thereby a reading error tends to occur.

Although the aforementioned Japanese Patent Laid Open Publication No. SHO 62-279776 describes the availability of a plasma element panel and a fluorescent element panel instead of the EL element, the thickness of such substitutes is larger than that of the EL element. Thus, it is difficult to effectively decrease the thickness of the machines. In addition, when such substitutes are used, they require vacuum environment in production. Therefore, when they are used in an application where the ratio of width and depth is high, such as the image sensor, the strength of the panel may be disadvantageously affected.

SUMMARY OF THE INVENTION

An object of the present invention is to provide a light emission element driven at a low DC voltage so as to prevent the intensity of the light from fluctuating, decrease the power consumption and provide a contact type image sensor for allowing a machine therewith to be thinly structured.

Another object of the present invention is to provide a method of producing a contact type image sensor whose intensity fluctuation and power consumption are small and which is thinly structured at a low cost.

The contact type image sensor according to the present invention comprises an optically transparent substrate, an illumination source disposed on one surface of the transparent substrate, the illumination source having a thin film light emitting element, the thin film light emitting element having at least an anode, a hole transport thin film, an electron transport organic fluorescent thin film, and a cathode, and a sensor section disposed on the other surface of the transparent substrate, the sensor section having a thin film photo sensitive element.

The method of producing a contact type image sensor according to the present invention comprising the steps of producing an illumination source having a thin film light emitting element, the thin film light emitting element being made by layering a transparent electroconductive thin film, a hole transport thin film, and an electron transport organic fluorescent thin film, which structure an anode, and then an electroconductive thin film, which structures a cathode, one after the other, on one surface of a transparent substrate, covering the thin film light emitting element with a sealing material, and producing a sensor section having a thin film photosensitive element on the other surface of the transparent substrate.

The contact type image sensor according to the present invention uses a thin film light emitting element, so-called an organic thin film EL element, comprising an anode, a hole transport thin film, an electron transport organic fluorescent thin film and a cathode. The organic thin film EL element emits light when a hole is coupled with an electron at the interface between the hole transport thin film and the electron transport organic fluorescent thin film. Thus, it is possible to drive the organic thin film EL element at a low DC voltage. Consequently, the fluctuation of the intensity of the light can be reduced and thereby the reading reliability can be remarkably improved. In addition, the drive circuit can be structured almost free from noise and in a small size. Moreover, the aforementioned thin film light emitting element is equally produced by means of the thin film technologies. Thus, the intensity of the light emitting of the entire element becomes equal, resulting in decreasing the fluctuation of light emitting and improving the reliability.

The aforementioned thin film light emitting elements can be driven with a small amount of power. In addition, the degradation of the luminance of the element is smaller than that of the conventional various light sources in the required luminance range as the light source of the contact type image sensor. Thus, the aforementioned thin film light emitting element allows the sensitivity of the sensor to be stably kept for a long time.

The contact type image sensor according to the present invention can be produced by means of the consistent thin film technologies, resulting in providing high productivity and effectively reducing the production cost.

DESCRIPTION OF PREFERRED EMBODIMENTS

Then, by referring to the accompanying drawings, embodiments of the present invention will be described in the following.

Figure 1:
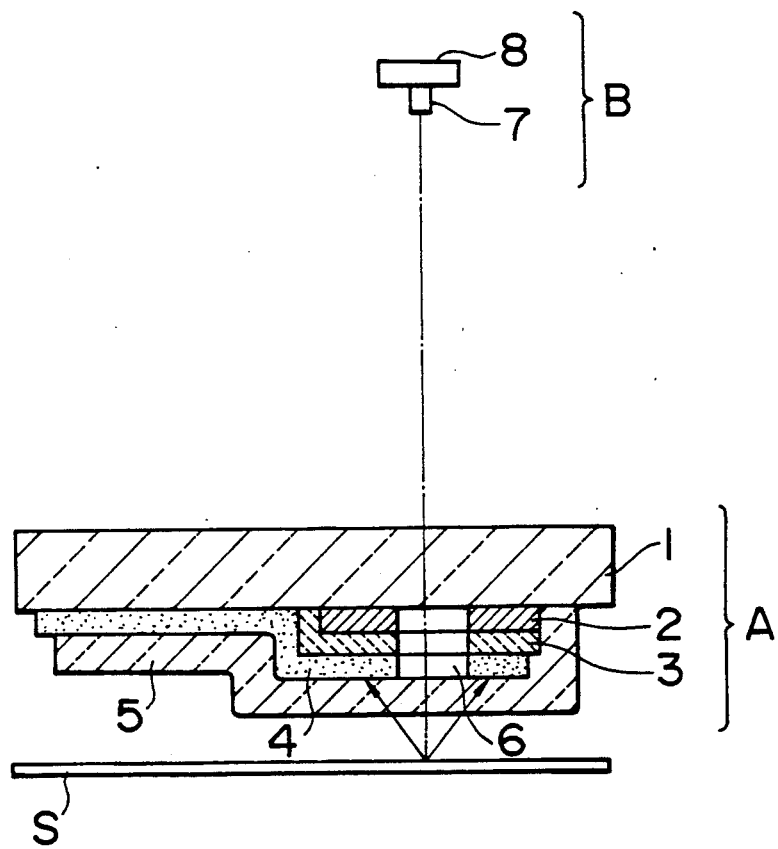
FIG. 1 is a sectional view showing an example of the structure of a conventional contact type image sensor.
Figure 2:
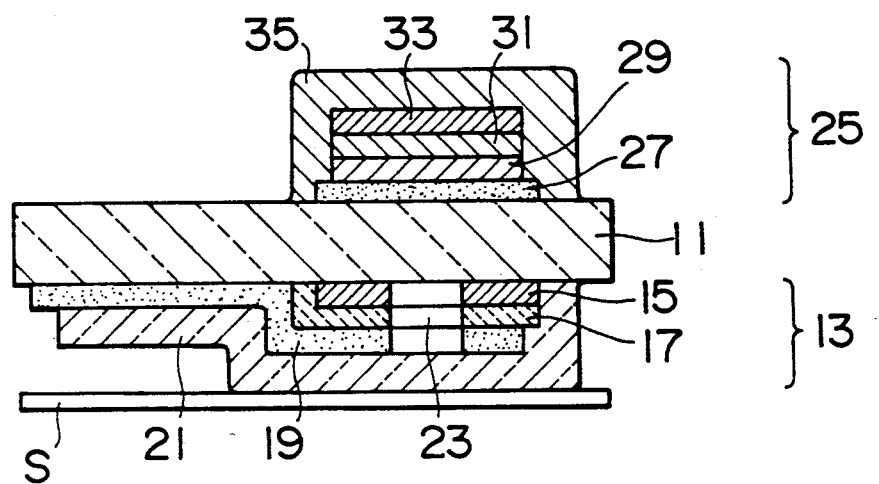
FIG. 2 is a sectional view showing the structure of principal portions of an embodiment of a contact type image sensor of the present invention.

FIG. 2 is a sectional view describing the structure of principal portions of a contact type image sensor according to an embodiment of the present invention. In the figure, numeral 11 is an optically transparent substrate which is a substrate for an image sensor, for example, a transparent glass substrate. A sensor section 13 is structured in such manner that a common electrode 15, an a-Si layer 17 as a photo sensitive material layer, a transparent electrode 19, and a transparent protection layer 21 are layered one after the other on one surface of the glass substrate 11. On the sensor section 13 composed of such parts, 2000 to 3000 thin film photo sensitive elements are disposed in an island shape and in pitches of 0.1 to 0.2 mm. Each thin film photosensitive element in the island shape has a light conductive window 23.

An illumination source 25 is opposed to the sensor section 13 on the other surface of the glass substrate 11, the illumination source 25 composing a thin film light emitting element, so-called an organic thin film EL element, where an anode 27, a hole transport thin film 29, an electron transport organic fluorescent thin film 31 and a cathode 33 are layered one after the other. The thin film light emitting element is covered with a protection layer 35 made of a sealing material, so as to seal it against air.

The aforementioned thin film light emitting element is structured in a belt shape, for example, the width and length being 2 mm and 250 mm, respectively. The thin film light emitting element is disposed so that it covers the entire surface of the a-Si layer 17 on the sensor section 13. In the contact type image sensor structured as described above, the light originated from the thin film light emitting element is irradiated to the document S through the glass substrate 11, the light conductive window 23 and the transparent protection layer 21, the reflected light being entered into the a-Si layer 17 through the transparent protection layer 21 and the transparent electrode 19 as a signal light.

For example, the illumination source 25 is produced in the following manner.

One surface of the glass substrate 11 is polished so as to smoothen the surface. After that, the surface is rinsed and dried. Subsequently, on the surface, a transparent electro conductive thin film composed of indium tin oxide (hereinafter named ITO), tin oxide, and so forth is formed as an anode 27 by means of a known thin film forming method such as vacuum evaporation method, spattering method, or CVD method.

After that, by using as an evaporation source phthalocyanine, oxadiazole, or a derivative triphenyldiamin, each of which is a hole carrier, the hole transport thin film 29 whose thickness is 700 Å to 1000 Å is formed by means of vacuum evaporation method, for example. As the material of the hole transport thin film 29, it is preferable to use an organic material having the hole transport property. However, it is possible to use a p-type inorganic semiconductor thin film or the like.

Subsequently, by using as an evaporation source coumarin coloring matter suitable for a laser coloring matter, or aluminum trisoxine a chelating oxinoido compound such as the electron transport organic fluorescent thin film 31 whose thickness is 700 Å to 1000 Å is formed by means of the vacuum evaporation method.

After that, by using as an evaporation source a metal can be said that the organic thin film EL element as the light source is very stable.

TABLE 1 shows the result of the evaluation of the characteristics of the contact type image sensor according to the above embodiment. The contents of the evaluation are with respect to overall thickness, luminance, fluctuation of light emitting, and noise in reading an image.

In comparison with the embodiment of the present invention, the evaluation of characteristics of the contact type image sensors using LED, FL, powder type EL element, inorganic thin film EL element, plasma element, and fluorescent element is tabulated.

TABLE 1

|  | Light source | Drive type and voltage | Shape of light source | Overall thickness of sensor | Brightness | Irregularity of light emitting | Noise |
| --- | --- | --- | --- | --- | --- | --- | --- |
| Embodiment | Organic thin film EL element | 5 VDC to 30 VDC | Line | ⊚ | ⊚ | ⊚ | ⊚ |
| Examples comparable | | | | | | | |
| 1 | LED | 12 VDC | Spot | X | ⊚ | X | ⊚ |
| 2 | FL | 100 VAC to 200 VAC | Line | X | ⊚ | X | X |
| 3 | Distributed type EL element | 100 VAC to 200 VAC | Line | ⊚ | Δ | ⊚ | X |
| 4 | Inorganic thin film EL element | 800 VAC to 1K VAC | Line | ⊚ | ⊚ | ⊚ | X |
| 5 | Plasma element | AC (DC) | Line | Δ | ⊚ | Δ | ⊚ |
| 6 | Fluorescent element | DC | Line | Δ | ⊚ | Δ | ⊚ | or alloy with a low work function and high stable oxidizing property, such as In, Al, Mg-In, or Mg-Al alloy, an electro conductive thin film whose thickness is 1000 Å to 2000 Å is formed as a cathode 33 by means of the electron beam evaporation method.

As a sealing material used for the protection layer 35, it is preferable to use vapor phase polymerization polyparaxylen, its derivative, silicon resin, or the like. The hole transport thin film 29 and the electron transport organic fluorescent thin film 31 described above tend to absorb moisture and oxygen and thereby they are remarkably degraded. Thus, it is necessary to seal them with a material which resists water and oxygen. The protection layer 35 with the sealing material is formed by means of the vapor phase polymerizating method, vacuum evaporation method, or wax coating method.

Figure 3:
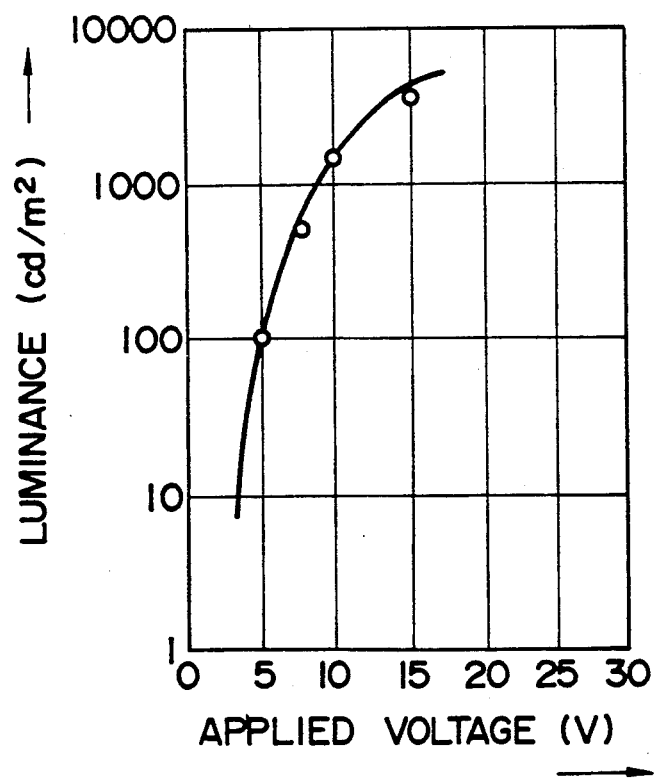
FIG. 3 is a chart showing an light emitting characteristic of an organic thin film EL element used in the contact type image sensor of the embodiment of the present invention.

FIG. 3 is a chart showing characteristics of applied voltages against luminance with respect to the contact type image sensor according to the above embodiment, where the anode 27 is ITO; the hole transport thin film 29 is phthalocyanine; the electron transport organic fluorescent thin film 31 is aluminum trisoxine; the cathode 33 is Mg-Al alloy; and the protection layer 35 is vapor phase polymerization polyparaxylen.

As shown in the figure, at a low DC voltage of approx. 5 V, it is clear that a luminance of 100 to 200 cd/m$^2$, which is necessary for the light source of the contact type image sensor, is obtained. The luminescence color is green and its center wave length ranges from 520 nm to 540 nm. A wave length ranges from 520 nm to 620 nm is the most sensitive range of a-Si. When the initial luminance is set to 100 to 200 cd/m$^2$, the luminance does not degrade over 2000 hours. Thus, it As in TABLE 1, the contact type image sensor according to the present invention is driven at a low DC voltage and provides high brightness without irregularity of electro luminescence. Thus, it is clear that the level of image reading noise is low. Thus, it can be understood that the reliability for reading an image is high.

Figure 4:
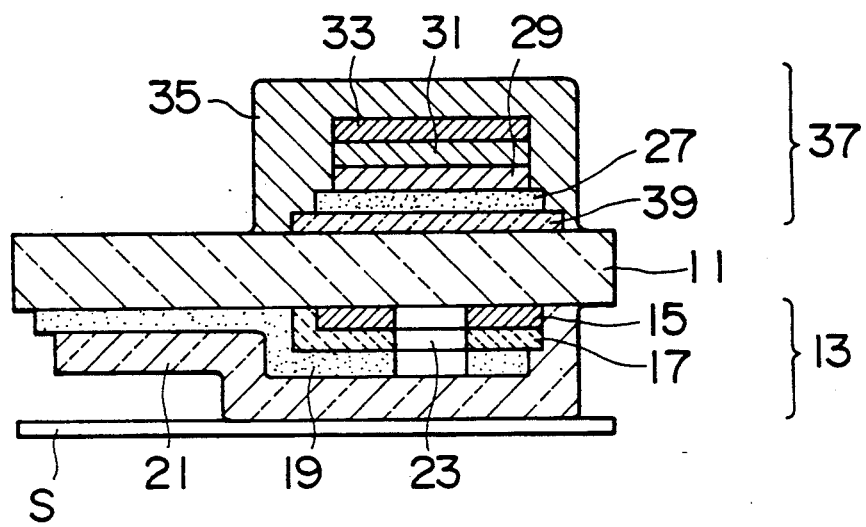
FIG. 4 is a sectional view showing the structure of principal portions of a contact type image sensor of another embodiment of the present invention.

Then, by referring to FIG. 4, a second embodiment of the contact type image sensor of the present invention will be described. In the figure, since the structure of the sensor section 13 is the the same as that shown in FIG. 2, same numerals are used and the description will be omitted.

An illumination source 37 of the contact type image sensor according to the second embodiment has a thin film light emitting element, which comprises a transparent substrate 39 (for example, a glass substrate or a transparent plastic film, which is not the glass substrate 11 used in the first embodiment), the anode 27, the hole transport thin film 29, the electron transport organic fluorescent thin film 31, and the cathode 33, which are layered on the transparent substrate 39 one after the other. The thin film light emitting element is in contact with one surface of the transparent substrate 39 and then covered with the protection layer 35 so as to sealably fix it.

Figure 5:
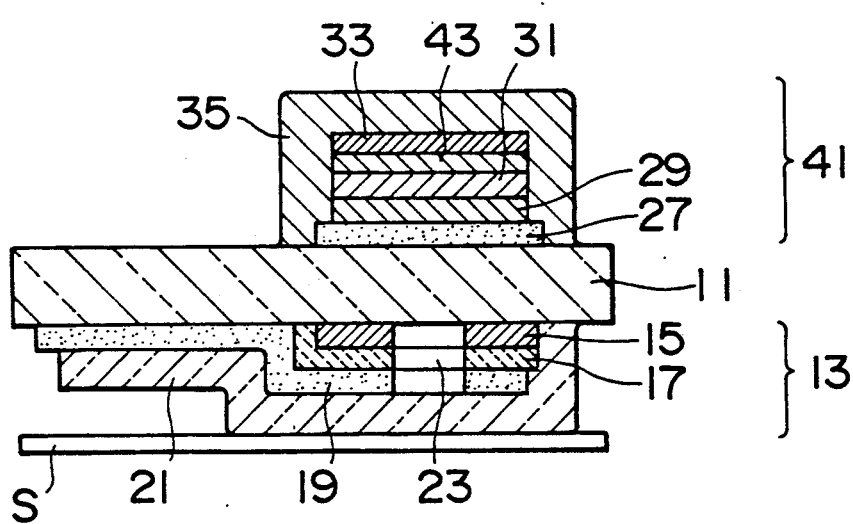
FIG. 5 is a sectional view showing the structure of principal portions of a contact type image sensor of another embodiment of the present invention.

Thus, the contact type image sensor according to the second embodiment provides the same effect as the first embodiment shown in FIG. 2. Moreover, the illumination source 25 can be produced separately from the sensor section 13, it is possible to improve the production efficiency. FIG. 5 is a sectional view showing the structure of a contact type image sensor of a third embodiment of the present invention. Since the structure of the sensor section 13 in the figure is the same as that shown in FIG. 2, the description will be omitted in the following.

As shown in the figure, an illumination source 41 in the third embodiment has a thin film light emitting element comprising the electron transport organic fluorescent thin film 31, the cathode 33, and an electron transport organic thin film 43, the electron transport organic thin film 43 being disposed between the electron organic fluorescent thin film 31 and the cathode 33. When a material which does not have high performance for forming a thin film as the electron transport organic fluorescent thin film 31 is used, the electron transport organic thin film 43 can effectively improve the thin film forming performance. In addition, the illumination source 41 of the third embodiment can provide the same effect as that of the first embodiment shown in FIG. 2.

In the embodiments described above, the light conductive window 23 was disposed nearly at the center of the sensor section 13. However, it is possible to disposed the light conductive window 23 on the side of the sensor section 13.

What is claimed is:

1. A contact type image sensor, comprising:
   an optically transparent substrate having first and second main surfaces;
   an illumination source disposed on said first main surface of said transparent substrate, said illumination source being driven by a direct current and having an organic type thin film light emitting element, said organic type thin film light emitting element having an optically transparent anode electrode, a hole transport thin film disposed on said anode electrode, an electron transport organic fluorescent thin film disposed on said hole transport thin film, and a cathode electrode disposed on said electron transport organic fluorescent thin film, said organic type thin film light emitting element being covered with a sealing material; and
   a sensor section disposed on said second main surface of said transparent substrate so as to face said organic type thin film emitting element, said sensor section having a thin film photo sensitive element.

2. The contact type image sensor as set forth in claim 1, wherein said anode electrode is disposed on said first main surface of said transparent substrate.

3. The contact type image sensor as set forth in claim 1, wherein said anode electrode is disposed on a transparent substrate layer and said transparent substrate layer is adhered to and disposed on said transparent substrate.

4. The contact type image sensor as set forth in claim 1, wherein said hole transparent thin film is a hole transport organic thin film.

5. The contact type image sensor as set forth in claim 1, wherein said hole transport thin film is a p-type inorganic semiconductor thin film.

6. The contact type image sensor as set forth in claim 1, wherein said thin film photosensitive element comprises a common electrode disposed on said second main surface of said transport substrate, a photosensitive material layer disposed on said common electrode, and a transport electrode disposed on said photosensitive material layer as a discrete electrode.

7. The contact type image sensor as set forth in claim 6, wherein a center wave length of luminescence of said thin film light emitting element ranges from 520 nm to 620 nm.

8. The contact type image sensor as set forth in claim 7, wherein said electron transport organic fluorescent thin film contains aluminum trisoxine, said photosensitive material containing amorphous silicon.

9. The contact type image sensor as set forth in claim 1, wherein said sealing material is at least one selected from vapor phase polymerization polyparaxylen and its derivatives.

10. A contact type image sensor, comprising:
    an optically transparent substrate having first and second main surfaces;
    an illumination source disposed on said first main surface of said transparent substrate, said illumination source being driven by a direct current and having an organic type thin film light emitting element, said organic type thin film light emitting element having an optically transparent anode electrode, a hole transport thin film disposed on said anode electrode, an electron transport organic fluorescent thin film disposed on said hole transport thin film, an electron transport organic thin film disposed on said electron transport organic fluorescent thin film, and a cathode electrode disposed on said electron transport organic fluorescent thin film, said organic type thin film light emitting element being covered with a sealing material; and
    a sensor section disposed on said second main surface of said transparent substrate so as to face said organic type thin film light emitting element, said sensor section having a thin film photosensitive element.

11. The contact type image sensor as set forth in claim 10, wherein said anode electrode is disposed on said first main surface of said transparent substrate.

12. The contact type image sensor as set forth in claim 10, wherein said anode electrode is disposed on a transparent substrate layer and said transparent substrate layer is adhered to and disposed on said transparent substrate.

13. The contact type image sensor as set forth in claim 10, wherein said sealing material is at least one selected from vapor phase polymerization polyparaxylen and its derivatives.

14. A method of producing a contact type image sensor, comprising the steps of:
    producing, on a transparent substrate having first and second main surfaces, an illumination source having an organic type thin film light emitting element, said illumination source being made by layering a transparent electroconductive thin film constituting an anode electrode, a hole transport thin film, and an electron transport organic fluorescent thin film, and then an electroconductive thin film constituting a cathode electrode, one after the other, on said first main surface of said transparent substrate;
    covering said organic type thin film light emitting element with a sealing material; and
    producing a sensor section on said second main surface of said transparent substrate so as to face said organic type thin film light emitting element, said sensor section having a thin film photosensitive element.

15. The method of producing a contact type image sensor as set forth in claim 14, wherein said step of producing a sensor section comprises a step of layering an electroconductive thin film constituting a common electrode, a photosensitive material thin film, and a transparent electroconductive thin film as a discrete electrode, one after the other.

* * * * *